(12) United States Patent
Kim et al.

(10) Patent No.: US 10,649,135 B2
(45) Date of Patent: May 12, 2020

(54) DISPLAY APPARATUS

(71) Applicant: SAMSUNG ELECTRONICS CO., LTD., Suwon-si (KR)

(72) Inventors: Hyung-ki Kim, Anyang-si (KR); Dae-young Kim, Suwon-si (KR); Yong-sung Yoo, Suwon-si (KR); Kil-hong Lee, Suwon-si (KR); Duk-jin Jeon, Bucheon-si (KR); Tae-hee Jeon, Namyangju-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/057,333

(22) Filed: Aug. 7, 2018

(65) Prior Publication Data

US 2019/0121016 A1 Apr. 25, 2019

(30) Foreign Application Priority Data

Oct. 23, 2017 (KR) .......................... 10-2017-0137346

(51) Int. Cl.
*F21V 8/00* (2006.01)

(52) U.S. Cl.
CPC ......... *G02B 6/0088* (2013.01); *G02B 6/0051* (2013.01); *G02B 6/0091* (2013.01)

(58) Field of Classification Search
CPC ......... G02F 1/133608; G02F 1/133615; G02F 2201/46; G02F 2201/465; G02F 2001/133314; G02F 1/1339
USPC .................................................. 362/600–634
See application file for complete search history.

(56) References Cited

U.S. PATENT DOCUMENTS

| 7,651,258 | B2 | 1/2010 | Kim |
| 8,077,271 | B2 | 12/2011 | Yang |
| 8,523,420 | B2 | 9/2013 | Baek et al. |
| 8,974,070 | B2 | 3/2015 | Baek et al. |

(Continued)

FOREIGN PATENT DOCUMENTS

| CN | 102062329 B | 4/2012 |
| CN | 101858545 B | 6/2012 |

(Continued)

OTHER PUBLICATIONS

International Search Report dated Nov. 14, 2018 issued by the International Searching Authority in International Application No. PCT/KR2018/009580 (PCT/ISA/210).

(Continued)

*Primary Examiner* — William J Carter
(74) *Attorney, Agent, or Firm* — Sughrue Mion, PLLC

(57) ABSTRACT

A display apparatus is provided. The display apparatus includes a display panel; a light guide plate configured to guide light to the display panel and disposed behind the display panel; a light source configured to emit light to a lateral surface of the light guide plate; a diffusion plate disposed between the display panel and the light guide plate; and at least one support member configured to support the diffusion plate and disposed to pass through the light guide plate, wherein a light transmittance of a portion of the at least one support member at a side of the support member facing the light source is different from a light transmittance of a remaining portion of the at least one support member.

20 Claims, 14 Drawing Sheets

(56) References Cited

U.S. PATENT DOCUMENTS

| | | | |
|---|---|---|---|
| 2007/0103908 A1* | 5/2007 | Tabito | G02F 1/133608 |
| | | | 362/97.1 |
| 2011/0051042 A1* | 3/2011 | Sato | G02B 6/008 |
| | | | 349/64 |
| 2011/0149598 A1 | 6/2011 | Min | |
| 2013/0021818 A1 | 1/2013 | Baek et al. | |
| 2013/0308343 A1 | 11/2013 | Baek et al. | |
| 2014/0211123 A1 | 7/2014 | Lee et al. | |
| 2015/0078032 A1 | 3/2015 | Horiguchi et al. | |
| 2015/0341587 A1 | 11/2015 | Chikazawa | |

FOREIGN PATENT DOCUMENTS

| | | |
|---|---|---|
| JP | 2007-157451 A | 6/2007 |
| KR | 10-1002311 B1 | 12/2010 |
| KR | 10-1081156 B1 | 11/2011 |
| KR | 10-2013-0011855 A | 1/2013 |
| KR | 10-1326299 B1 | 11/2013 |

OTHER PUBLICATIONS

Written Opinion dated Nov. 14, 2018 issued by the International Searching Authority in International Application No. PCT/KR2018/009580 (PCT/ISA/237).

* cited by examiner

DISPLAY APPARATUS

CROSS-REFERENCE TO RELATED APPLICATIONS

This application is based on and claims priority under 35 U.S.C. § 119 to Korean Patent Application No. 10-2017-0137346, filed on Oct. 23, 2017, in the Korean Intellectual Property Office, the disclosure of which is incorporated herein by reference in its entirety.

BACKGROUND

Field

The disclosure relates to a display apparatus.

Description of the Related Art

A display apparatus is an apparatus for displaying an image using a display panel and is used in various devices such as a television, a computer monitor, and a smartphone. However, since a general display apparatus is not capable of autonomously emitting light, the display apparatus requires a backlight unit which includes a separate light source and is disposed behind a display panel.

The backlight unit is classified into a direct-lit type backlight unit including a light source disposed behind a display panel to directly emit light to the display panel, and an edge-lit type backlight unit including a light source disposed on a lateral surface of a light guide plate that is disposed behind a display panel and uniformly guides light incident on the light guide plate to the display panel through the light guide plate.

A display apparatus including a typical edge-lit type backlight unit is advantageously thinner than a display apparatus including a direct-lit type backlight unit in that a light source is disposed on a lateral surface of a light guide plate, but there is a limit in that a size of a display panel is determined to be the same as a size of a light guide plate because the display apparatus including the typical edge-lit type backlight unit is configured by stacking a diffusion plate and a display panel on a light guide plate.

SUMMARY

Provided are a display apparatus capable of improving image quality and reducing a size of a light guide plate.

Additional aspects will be set forth in part in the description which follows and, in part, will be apparent from the description, or may be learned by practice of the presented embodiments.

In accordance with an aspect of the disclosure, a display apparatus includes a display panel, a light guide plate configured to guide light to the display panel and disposed behind the display panel, a light source configured to emit light to a lateral surface of the light guide plate, a diffusion plate disposed between the display panel and the light guide plate, and at least one support member configured to support the diffusion plate and disposed to pass through the light guide plate, wherein a light transmittance of a portion of the at least one support member at a side of the support member facing the light source is different from a light transmittance of a remaining portion of the at least one support member.

The light guide plate may include at least one insertion hole to which the at least one support member is coupled, wherein the at least one support member includes an insertion portion inserted into the insertion hole, a cover portion that contacts the light output surface of the light guide plate and covers the insertion hole, and a support portion that supports the diffusion plate, and wherein a light transmittance of a portion of the cover portion at the side of the support member facing the light source is lower than a light transmittance of a remaining portion of the cover portion.

A diameter of the cover portion may be larger than a diameter of the insertion hole to cover a surrounding portion of the insertion hole, and the insertion portion may protrude toward the insertion hole from a center of the cover portion.

The cover portion may include a first portion at the side of the support member facing the light source and a second portion at an opposite side of the diffusion support member, and a light transmittance of the first portion may be lower than a light transmittance of the second portion.

The cover portion may include a plate positioned parallel to the light output surface.

The cover portion may include a circular plate. The first portion may have a circular sector shape with respect to a center of the insertion hole, and the second portion may have a complementary circular sector shape to the circular sector shape of the first portion.

A central angle of the first portion may be smaller than a central angle of the second portion.

The first portion may include a light-blocking material, and the second portion may include a light-transmissive material.

The first portion may be white and the second portion may be transparent.

The insertion portion may include the light-blocking material.

The first portion and the insertion portion may be integrally formed with each other.

The support portion may protrude toward the diffusion plate from a center of the cover portion.

The support portion may include an arch-shaped buffer portion with opposite ends coupled to the cover portion and a support protrusion coupled to the buffer portion to support the diffusion plate.

The first portion may include a reflective lens configured to reflect light discharged from the insertion hole.

The first portion may include a diffusion lens configured to diffuse light discharged from the insertion hole.

According to yet another aspect of the present disclosure, a display apparatus includes a light guide plate, a diffusion plate, a light source configured to emit light toward a side surface of the light guide plate, and a support member including a contact portion configured to contact a rear surface of the diffusion plate, a fitting portion configured to fit into a hole provided in the light guide plate, and a disk portion configured to rest on a front surface of the light guide plate. The disk portion may include a first region provided closer to the light source than a second region of the disk portion and a light transmittance of the first region may be lower than a light transmittance of the second region.

The display apparatus may further include a display panel provided in front of the diffusion plate.

The display apparatus may further include a chassis provided behind the light guide plate. The fitting portion of the support member may be configured to fit into a hole provided in the chassis.

The first region of the disk portion may include a partial reflective lens.

A refraction groove may be formed in the first region of the disk portion.

Additional and/or other aspects and advantages will be set forth in part in the description which follows and, in part, will be obvious from the description, or may be learned by practice.

BRIEF DESCRIPTION OF THE DRAWING FIGURES

The above and other aspects, features, and advantages of certain embodiments of the present disclosure will be more apparent from the following description taken in conjunction with the accompanying drawings, in which.

DETAILED DESCRIPTION

Figure 1:
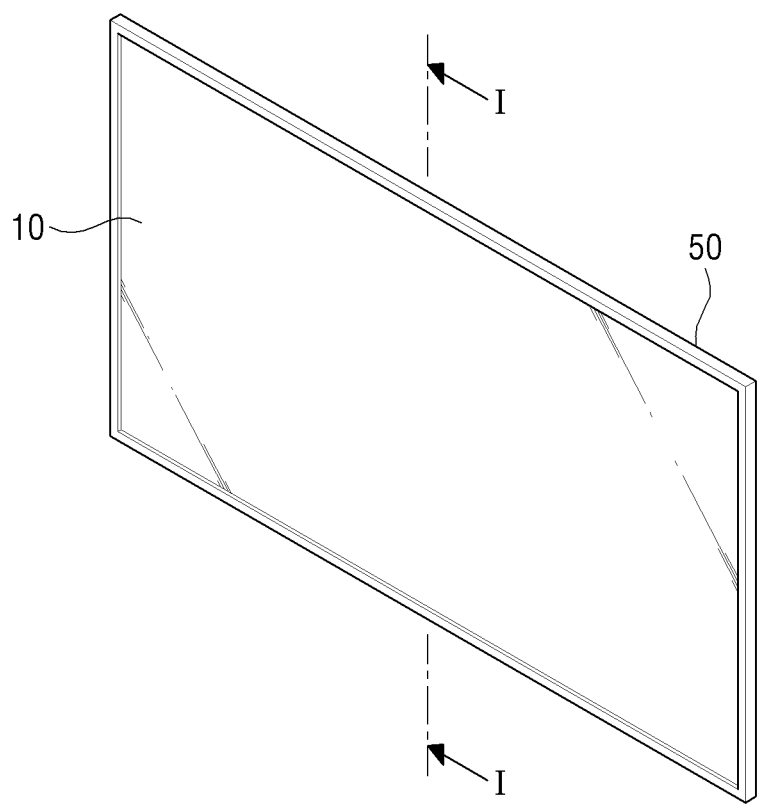
FIG. 1 is a perspective view of a display apparatus according to an embodiment.
Figure 1:
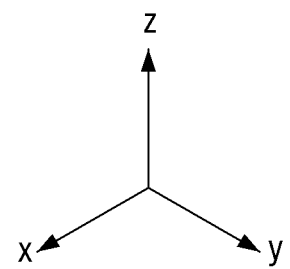

Certain embodiments will now be described in greater detail with reference to the accompanying drawings. The present disclosure may, however, be embodied in many different forms and should not be construed as limited to the embodiments set forth herein. Rather, these embodiments are provided so that this disclosure will be thorough and complete, and will fully convey the scope of the disclosure to those of ordinary skill in the art.

In the following description, same drawing reference numerals are used for the same elements even in different drawings. The matters defined in the description, such as detailed construction and elements, are provided to assist in a comprehensive understanding of the disclosure. Thus, it is apparent that the embodiments of the present disclosure can be carried out without those specifically defined matters. Also, well-known functions or constructions are not described in detail since they would obscure the disclosure with unnecessary detail.

Accordingly, as those skilled in the art would realize, the described embodiments may be modified in various different ways and the modified embodiments are within the scope of the present disclosure. With regard to reference numerals for the purpose of providing an understanding of the following embodiments, the same or equivalent reference numerals designate related elements among elements that perform the same functions in different drawings. In addition, some elements shown in the drawings may be exaggerated for the purpose of providing an understanding of the following embodiments, but not on an actual scale.

Figure 2:
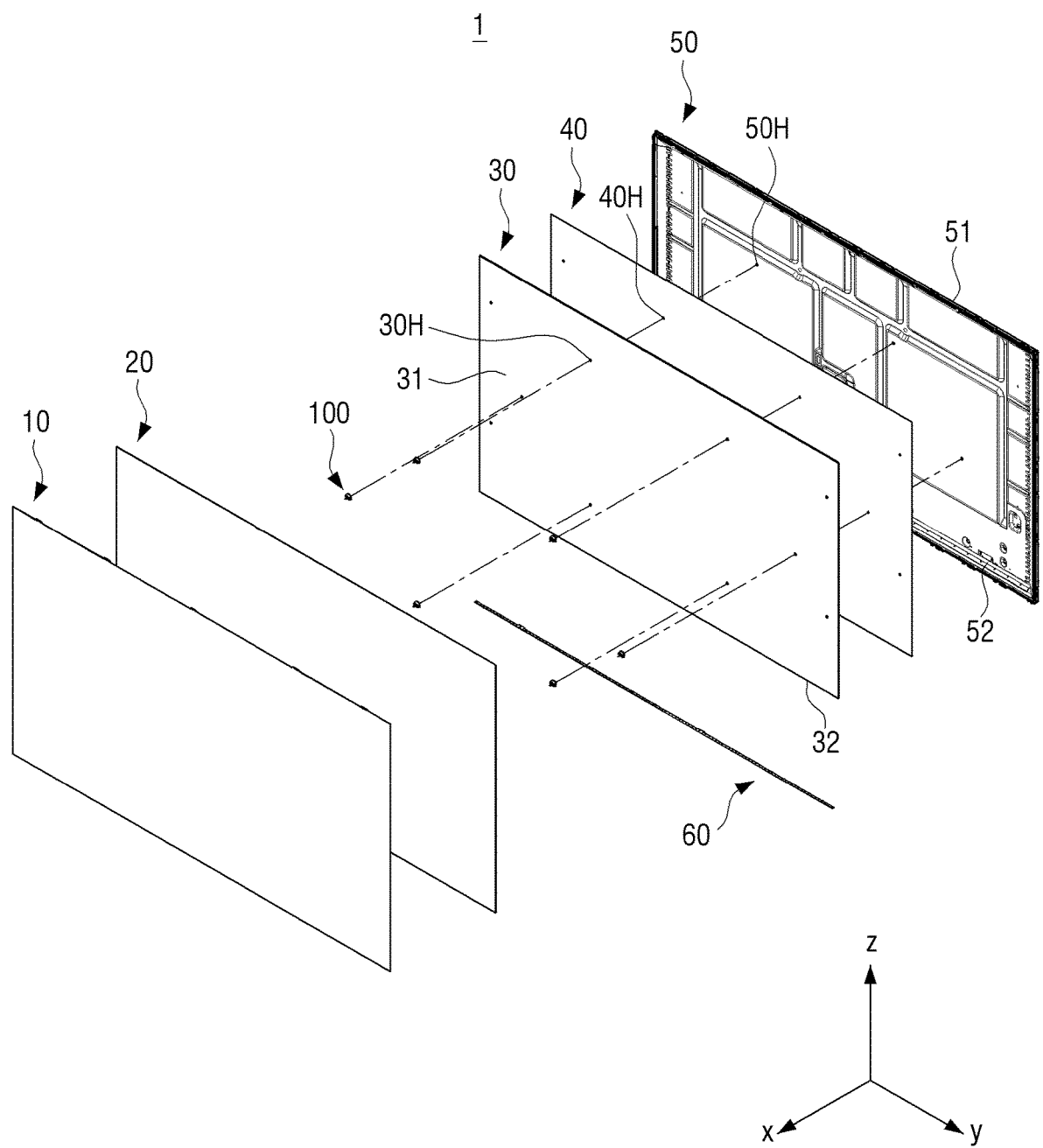
FIG. 2 is an exploded perspective view of the display apparatus illustrated in FIG. 1.
Figure 3:
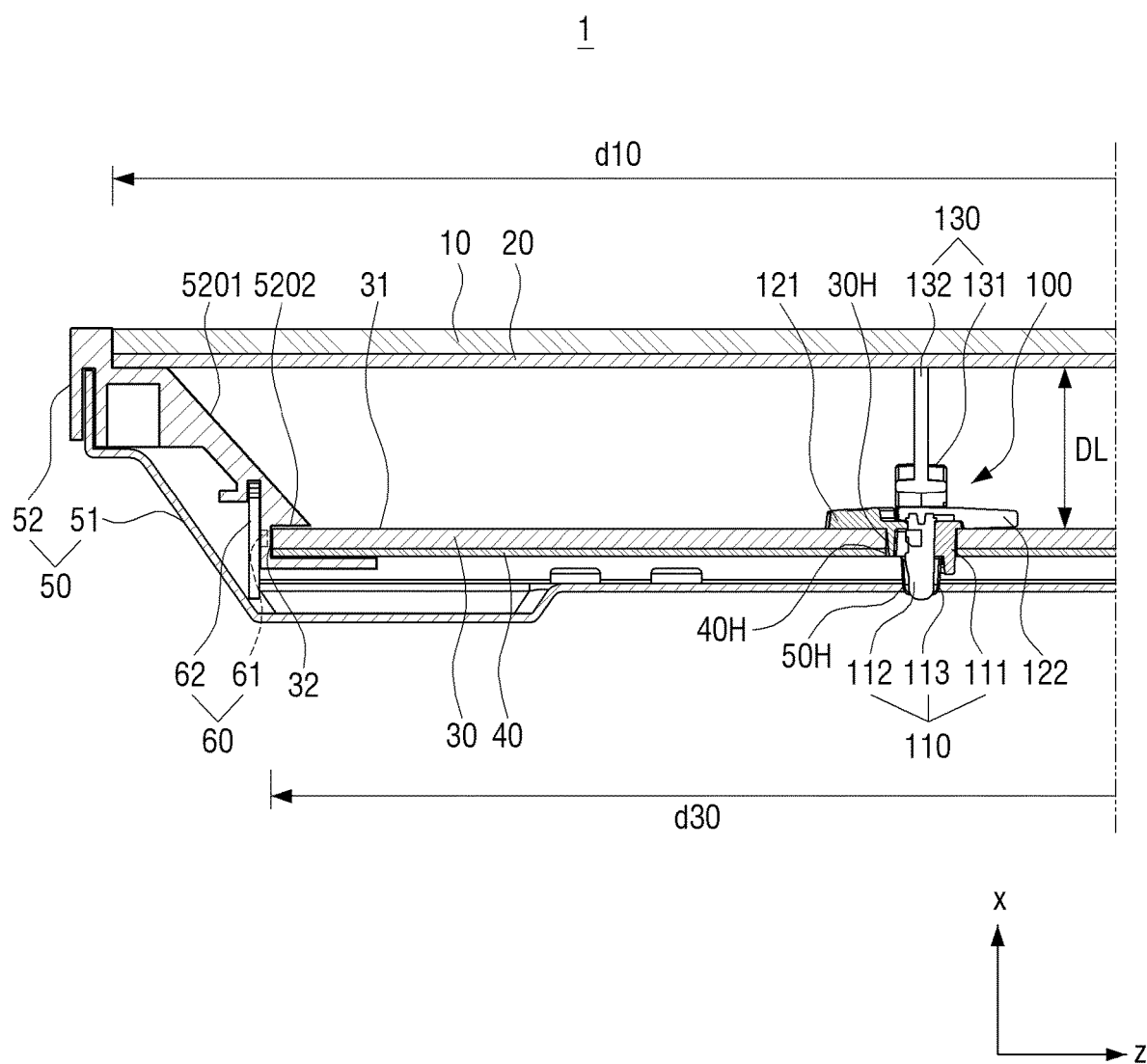
FIG. 3 is a cross-sectional view of a portion of the display apparatus taken along a line I-I illustrated in FIG. 1.

FIG. 1 is a perspective view of a display apparatus 1 according to an embodiment. FIG. 2 is an exploded perspective view of the display apparatus 1 illustrated in FIG. 1. FIG. 3 is a cross-sectional view of a portion of the display apparatus 1 taken along a line I-I illustrated in FIG. 1.

Hereinafter, the display apparatus 1 may be an apparatus for processing an image signal received from an external source and visually displaying the processed image, may be embodied in various forms such as a television, a monitor, a portable multimedia apparatus, and a portable communication apparatus and may be any type apparatus for visually displaying an image.

As shown in FIGS. 1, 2, and 3, the display apparatus 1 may include a display panel 10, a diffusion plate 20, a light guide plate 30, a reflective sheet 40, a case 50, a light source 60, and at least one support member (i.e., support device) 100 coupled to the light guide plate 30 to support the diffusion plate 20.

The display panel 10 may display an image in a front direction (the X-axis direction of FIG. 1) according to an image signal input from an external source and may include a liquid crystal display (LCD) panel.

Although FIGS. 1, 2, and 3 illustrate an example in which the display apparatus 1 of the display panel 10 has a rectangular shape, the display apparatus 1 and the display panel 10 may be modified in various form without being limited thereto.

The diffusion plate 20, the light guide plate 30, the reflective sheet 40, and the case 50 may be sequentially coupled to a rear side of the display panel 10 and the light source 60 may be disposed adjacent to one of lateral surfaces (i.e., a side surface) of the light guide plate 30 to emit light toward one lateral surface of the light guide plate 30.

As shown in FIG. 2, the light source 60 may extend in a longitudinal direction of the light guide plate 30 and may be disposed adjacent to a lower lateral surface 32 of the light guide plate 30 to emit light toward the light guide plate 30.

As shown in FIG. 3, one lateral surface 32 of the light guide plate 30 which is disposed to face the light source 60 and on which light is incident may be referred to as a light incident portion 32 of the light guide plate 30.

The light source 60 may output light (single color light) of a single wavelength (single color) or light (white light) formed by mixing light beams of a plurality of wavelengths.

The light source 60 may include a printed circuit board (PCB) 62 extending in a longitudinal direction of the light guide plate 30 and a plurality of light-emitting devices 61 disposed in a longitudinal direction of the PCB 62.

The plurality of light-emitting devices 61 may be disposed along the light incident portion 32 of the light guide plate 30 to emit light to the light incident portion 32 of the light guide plate 30.

The plurality of light-emitting devices 61 may include a light emitting diode (LED), a cold cathode fluorescent lamp (CCFL), an external electrode fluorescent lamp (EEFL), a laser diode (LD), or the like.

The light guide plate 30 may guide light emitted from the light source 60 toward the display panel 10, may convert light emitted from the light source 60 into uniform surface light, and may emit the surface light to the display panel 10.

The light guide plate 30 may internally refract, reflect, and scatter light emitted from the light source 60 and discharge light with a uniform amount and uniform distribution through a light output surface 31 facing the diffusion plate 20.

The light output surface 31 may include a plurality of optical patterns formed thereon to uniformly distribute light emitted through the light output surface 31.

The light guide plate 30 may include poly methyl methacrylate (PMMA), polycarbonate (PC), or the like.

The diffusion plate 20 may be disposed between the display panel 10 and the light guide plate 30.

The diffusion plate 20 may be coupled to a rear surface of the display panel 10.

The diffusion plate 20 may diffuse and scatter light discharged from the light output surface 31 of the light guide plate 30 and may diffuse light emitted from the light guide plate 30 to visually equalize overall color and brightness of an image displayed through the display panel 10.

In addition, a prism sheet, a protective sheet, a double brightness enhance file (DBEF), or the like may be additionally coupled to a front or rear surface of the diffusion plate 20.

The prism sheet and the DBEF may refract or collect light diffused through the diffusion plate 20 to enhance brightness thereof and the protective sheet may protect components disposed inside the diffusion plate 20, the prism sheet, the DBEF, and the display apparatus 1 from external shock or impurities.

The reflective sheet 40 may be disposed on a rear surface of the light guide plate 30.

The reflective sheet 40 may be coupled to a rear surface of the light guide plate 30, and may reflect light directed toward the rear surface of the light guide plate 30 from an internal part of the light guide plate 30, into the light guide plate 30.

The reflective sheet 40 may be formed of a material for reflecting light, for example, polymer.

As such, light emitted from the light source 60 toward the light incident portion 32 of the light guide plate 30 may be passed through the internal part of the light guide plate 30 and may be guided to the diffusion plate 20 through the light output surface 31 of the light guide plate 30. The light diffused through the diffusion plate 20 may then be incident on the display panel 10, and the display panel 10 may display the received light as an image.

The at least one support member 100 for supporting the diffusion plate 20 may be disposed between the light guide plate 30 and the diffusion plate 20.

The support member 100 may be disposed on the light output surface 31 of the light guide plate 30 to support the diffusion plate 20.

As such, the light guide plate 30 and the diffusion plate 20 may be spaced apart from each other at a predetermined interval to face each other and the light guide plate 30 and the diffusion plate 20 may be spaced apart from each other by a predetermined optical distance length DL (see, e.g., FIG. 3).

The diffusion plate 20 may be supported by the at least one support member 100 disposed on the light guide plate 30.

In detail, the light guide plate 30 may include at least one insertion hole 30H to which the at least one support member 100 is coupled. The at least one support member 100 may be disposed through the insertion hole 30H.

For example, as shown in FIG. 2, the light guide plate 30 may include six insertion holes 30H disposed at predetermined positions in the light output surface 31.

The support member 100 may be a plurality of support members 100, for example, six support members 100, that are inserted into and coupled to the six insertion holes 30H formed in the light guide plate 30, respectively.

The plurality of insertion holes 30H may be radially disposed with respect to a center of the light output surface 31 and the plurality of support members 100 may be coupled to the plurality of insertion holes 30H to be radially disposed with respect to the center of the light output surface 31.

Accordingly, the plurality of support members 100 may be disposed on the light output surface 31 of the light guide plate 30 and may be coupled to the light guide plate 30, such that the diffusion plate 20 may be supported by the plurality of support members 100.

The diffusion plate 20 may be relatively thin compared with an area thereof and, thus, may be supported by the support member 100 while being spaced apart from the light guide plate 30 at a predetermined interval to be maintained in a flat state without sagging or being bent.

However, the number and arrangement of the support members 100 may be changed in various ways and, in this regard, a single support member 100 may be disposed on the center of the light output surface 31 to support a central portion of the diffusion plate 20.

A detailed structure of the support member 100 is described below.

As shown in FIGS. 1, 2, and 3, the case 50 may be coupled to a rear surface portion of the display apparatus 1.

The display panel 10, the diffusion plate 20, the light guide plate 30, the reflective sheet 40, and the light source 60 may be disposed in the case 50, and the case 50 may protect various components disposed inside the display apparatus 1, for example, the diffusion plate 20, the light guide plate 30, the reflective sheet 40, and the light source 60.

As shown in FIG. 3, the case 50 may include a chassis 51 and a holder 52.

The chassis 51 may be disposed behind the display panel 10 to form an outer appearance of rear surface and lateral surface portions of the display apparatus 1 and may surround a lateral surface of the display panel 10.

Components such as the diffusion plate 20, the light guide plate 30, the reflective sheet 40, and the light source 60 may be disposed inside the chassis 51.

The chassis 51 may protect various components included in the display apparatus 1 from being externally exposed and may protect various components included in the display apparatus 1 from external shock.

The chassis 51 may be formed like a square ring and may further include a front chassis provided on a display surface of the display panel 10 to prevent an edge portion of the display panel 10 from being externally exposed.

The holder 52 may be disposed inside the chassis 51 and may be coupled to the chassis 51.

In detail, the holder 52 may support an edge portion of the display panel 10 and an edge portion of the diffusion plate 20 inside the chassis 51.

As shown in FIG. 3, an area of the display panel 10 may be larger than an area of the light guide plate 30. Accordingly, a length d10 of the display panel 10 may be greater than a length d30 of the light guide plate 30.

An area of the diffusion plate 20 coupled to a rear surface of the display panel 10 may be the same as an area of the display panel 10 and, thus, a length of the diffusion plate 20 may also be the same as the length d10 of the display panel 10.

The holder 52 may include an inclination portion 5201 that is inclined toward the edge portion of the diffusion plate 20 from the edge portion of the light guide plate 30.

The holder 52 may include a coupling groove 5202 to which the edge portion of the light guide plate 30 is coupled.

The inclination portion 5201 may guide light discharged from the edge portion of the light output surface 31 to the edge portion of the diffusion plate 20 and the edge portion of the display panel 10.

As such, light discharged from the light output surface 31 may be uniformly diffused while being moved in optical distance length DL and may be guided through the inclination portion 5201 to be uniformly incident on the diffusion plate 20 and the edge portion of the display panel 10.

The holder 52 may be shaped like a square ring corresponding to a shape of the light guide plate 30 and the diffusion plate 20, and the inclination portion 5201 may be shaped like an inclined surface toward the edge portion of the diffusion plate 20 from the edge portion of the light guide plate 30.

The inclination portion 5201 may be formed of a material for reflecting light to easily guide light discharged from the light output surface 31 the edge portion of the diffusion plate 20. A surface of the inclination portion 5201 may also, or alternatively, be coated with a material for reflecting light.

As such, the diffusion plate 20 and the light guide plate 30 may be spaced apart from each other at a predetermined distance to form the optical distance length DL between the diffusion plate 20 and the light guide plate 30 so as to easily guide light discharged from the light output surface 31 to the diffusion plate 20 and the display panel 10 that have a larger area than the light guide plate 30 through the inclination portion 5201 of the holder 52.

The light guide plate 30 and the diffusion plate 20 may be spaced apart from each other at a predetermined optical distance length DL and may easily guide light emitted from the light guide plate 30 to the edge portion of the diffusion plate 20 and, thus, a size of the light guide plate 30 may be smaller than a size of the display panel 10 and the diffusion plate 20.

As such, the size of the light guide plate 30 may be reduced and an entire size and weight of the display apparatus 1 may be reduced.

Figure 4:
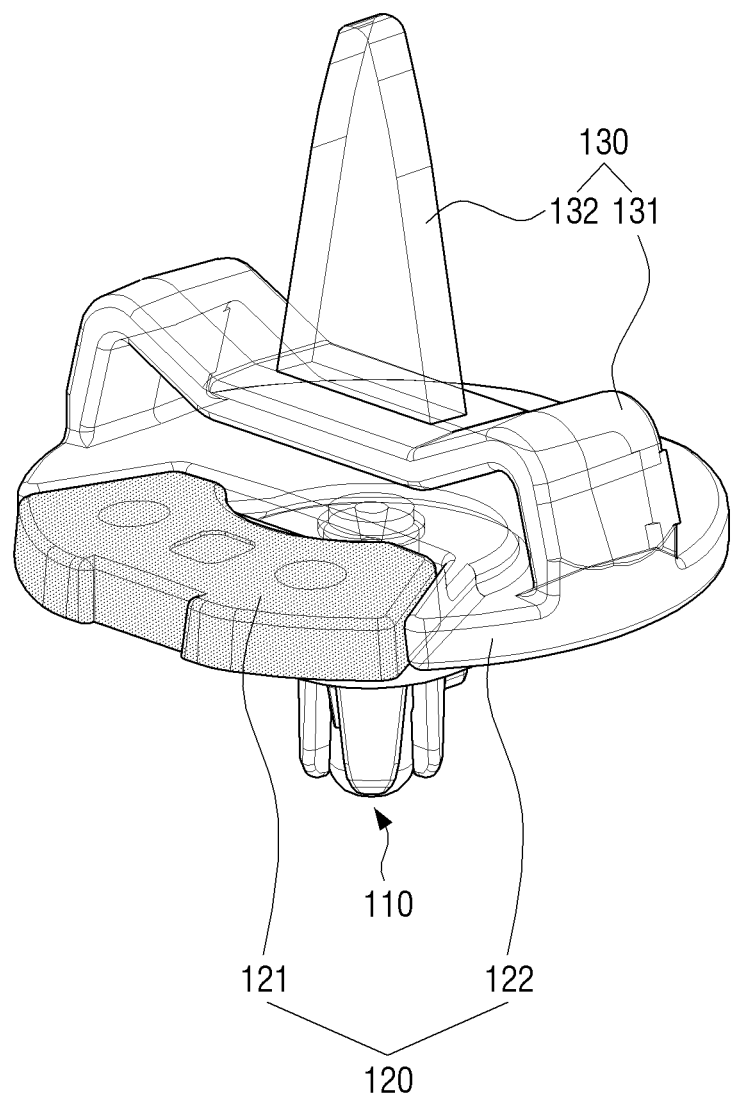
FIG. 4 is a perspective view of a support member according to an embodiment.
Figure 5:
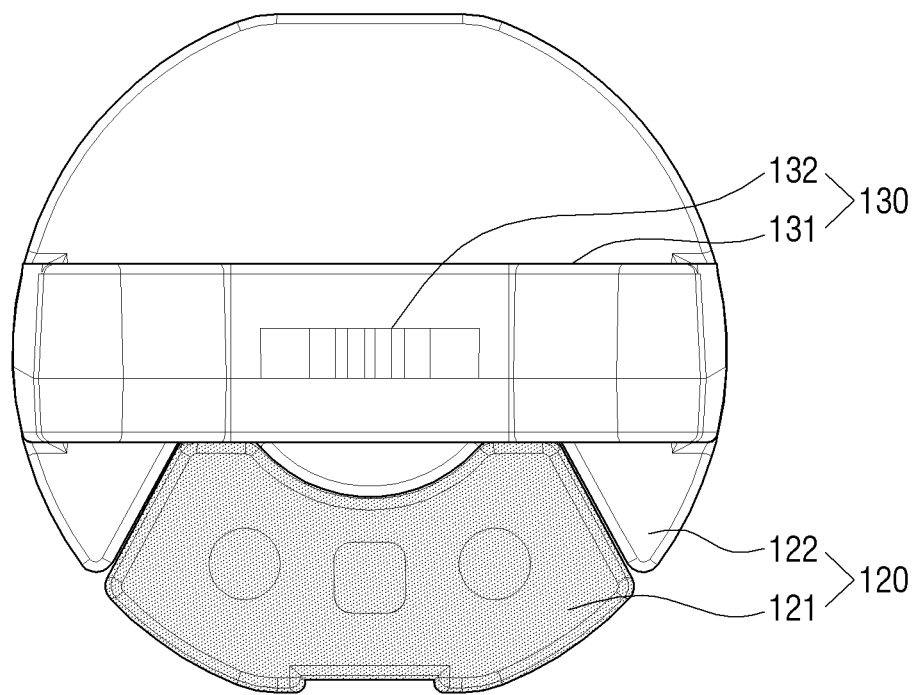
FIG. 5 is a plan view of a support member according to an embodiment.
Figure 6:
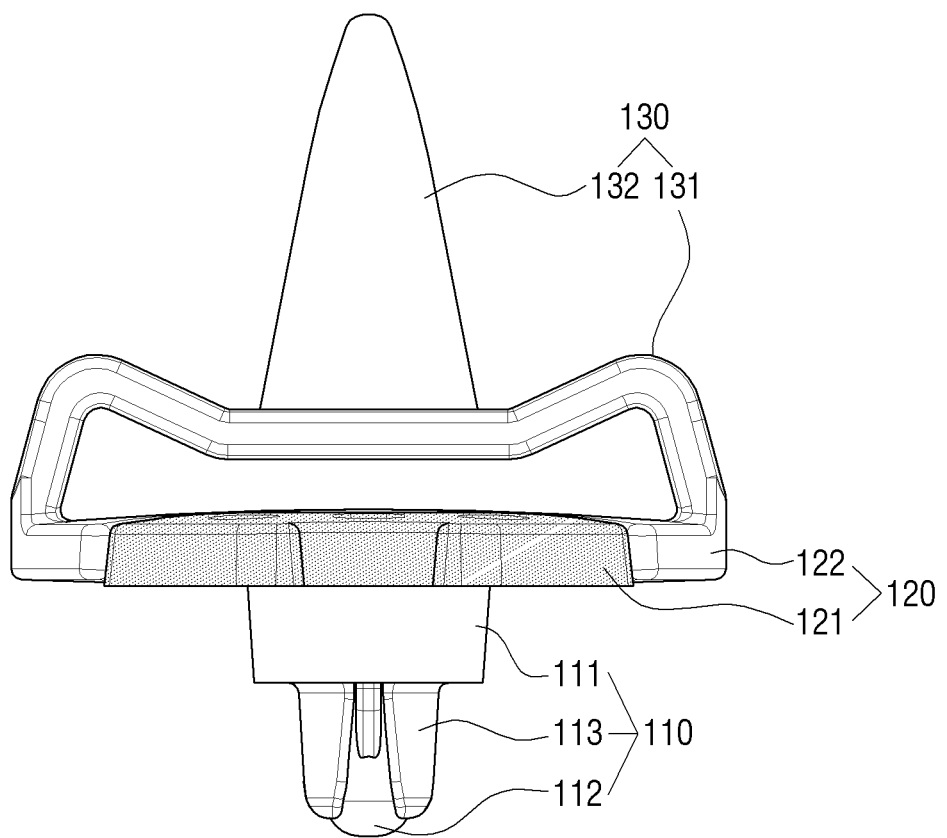
FIG. 6 is a front view of a support member according to an embodiment.
Figure 7:
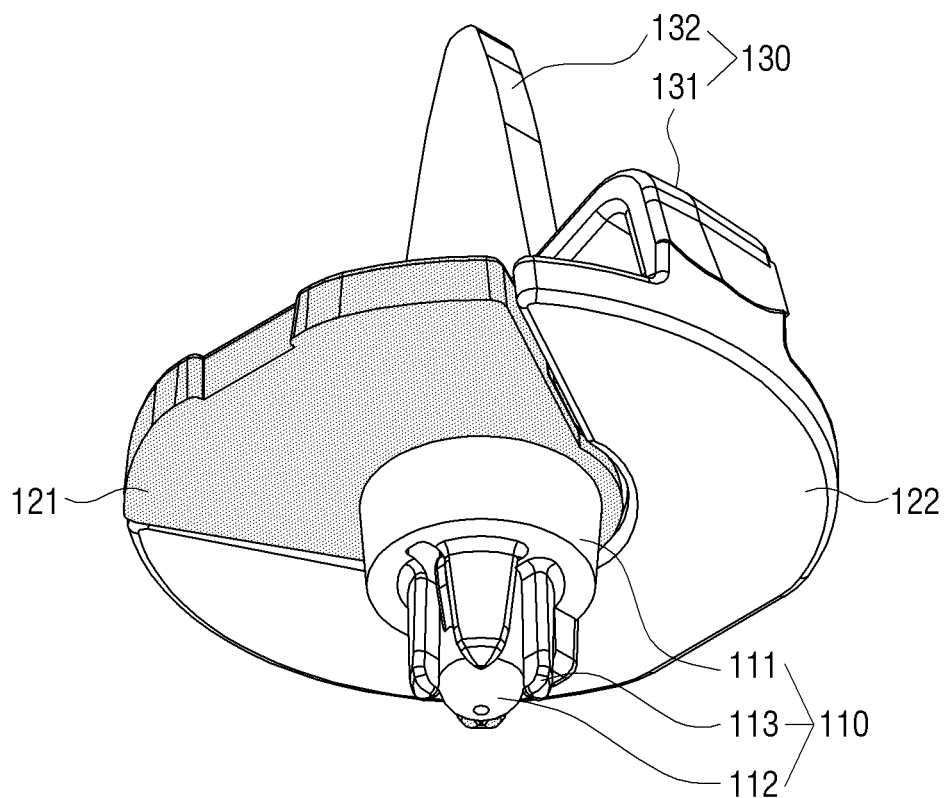
FIG. 7 is a bottom perspective view of a support member according to an embodiment.

FIG. 4 is a perspective view of the support member 100 according to an embodiment. FIG. 5 is a plan view of the support member 100 according to an embodiment. FIG. 6 is a front view of the support member 100 according to an embodiment. FIG. 7 is a bottom perspective view of the support member 100 according to an embodiment.

Hereinafter, a detailed structure of the support member 100 is described with reference to FIGS. 3, 4, 5, 6, and 7.

As shown in FIGS. 3, 4, 5, 6, and 7, the support member 100 may include an insertion portion 110, a cover portion 120, and a support portion 130.

The insertion portion (i.e., fitting portion) 110 may be inserted into and coupled to the insertion hole 30H of the light guide plate 30 and, thus, the support member 100 may be coupled to the light guide plate 30.

The cover portion (i.e., disk portion) 120 may be coupled to a front portion of the insertion portion 110 and may contact the light output surface 31 of the light guide plate 30 to cover a surrounding portion of the insertion hole 30H to which the insertion portion 110 is inserted.

The support portion (i.e., contact portion) 130 for supporting the diffusion plate 20 may be coupled to a front portion of the cover portion 120.

The support portion 130 may contact a rear surface of the diffusion plate 20 to support the diffusion plate 20.

The insertion portion 110 may protrude toward the insertion hole 30H from the center of the cover portion 120.

The insertion portion 110, the cover portion 120, and the support portion 130 may be integrally formed and may be formed of a synthetic resin material.

As shown in FIG. 3, the insertion portion 110 may be inserted into and coupled to the chassis 51 through the light guide plate 30 and the reflective sheet 40.

As a detailed example, the insertion portion 110 may include a first insertion protrusion 111, a second insertion protrusion 112, and a plurality of fitting members 113.

The first insertion protrusion 111 may be coupled to a rear portion of the cover portion 120 and may be inserted into and coupled to the insertion hole 30H of the light guide plate 30.

The reflective sheet 40 may include a coupling hole 40H, to which a portion of the first insertion protrusion 111 disposed through the insertion hole 30H of the light guide plate 30 is inserted, to correspond to the insertion hole 30H of the light guide plate 30.

The second insertion protrusion 112 may protrude toward the chassis 51 from the first insertion protrusion 111 and may be configured with a smaller diameter than the first insertion protrusion 111.

In addition, the plurality of fitting members 113 may be disposed on an outer circumference of the second insertion protrusion 112 along a circumference of the second insertion protrusion 112.

The case 50 may include a coupling hole 50H into and to which the second insertion protrusion 112 with the plurality of fitting members 113 coupled thereto is inserted and coupled.

The coupling hole 50H of the case 50 may be formed on a rear surface of the chassis 51 to allow the second insertion protrusion 112 to be inserted thereinto such that the coupling hole 50H of the case 50 may correspond to the coupling hole 40H of the reflective sheet 40.

The plurality of fitting members 113 may be inserted into the coupling hole 50H of the chassis 51 along with the second insertion protrusion 112 and may be press-fit to the coupling hole 50H of the chassis 51.

To this end, a diameter of the coupling hole 50H of the chassis 51 may be smaller than a diameter of the fitting member 113.

As such, the insertion portion 110 is inserted into and coupled to the light guide plate 30, the reflective sheet 40, and the case 50 and, thus, the support member 100 may stably support the diffusion plate 20 while being fixed to the light guide plate 30.

The support portion 130 may protrude toward the diffusion plate 20 from the center of the cover portion 120.

The support portion 130 may be supported by the cover portion 120.

In detail, the support portion 130 may include an arch-shaped buffer portion 131 with opposite ends coupled to the cover portion 120 and a support protrusion 132 coupled to an upper portion of the buffer portion 131 to contact the diffusion plate 20.

The buffer portion 131 may be arch-shaped and may have opposite ends coupled to the cover portion 120, and the support protrusion 132 may protrude toward the diffusion plate 20 from the center of the buffer portion 131. As such, the support portion 130 may absorb external shock applied to the diffusion plate 20 and the display panel 10.

The cover portion 120 may be disposed between the insertion portion 110 and the support portion 130.

The cover portion 120 may have a larger diameter than a diameter of the insertion hole 30H to cover the surrounding portion of the insertion hole 30H while contacting the light output surface 31. As such, the cover portion 120 may block a portion of light discharged toward the diffusion plate 20 through the insertion hole 30H and the surrounding portion of the insertion hole 30H.

As shown in FIGS. 3 to 7, the cover portion 120 may be shaped like a plate positioned parallel to the light output surface 31 and may be shaped like an approximate circular plate.

Accordingly, the cover portion 120 may be supported by the light guide plate 30.

The cover portion 120 may cover the surrounding portion of the insertion hole 30H to block a portion of light discharged toward the diffusion plate 20 from the insertion hole 30H.

A portion of the cover portion 120, which is adjacent to the light source 60, may have lower light transmittance than that of the remaining portion.

In detail, the cover portion 120 may include a first portion 121 at a side of the cover portion 120 that faces the light source 60 and a second portion 122 at an opposite side of the light source 60 (i.e., the first portion 121 is closer to the light source 60 than the second portion 122).

That is, the cover portion 120 that contacts the light output surface 31 to cover the insertion hole 30H may be divided into the first portion 121 and the second portion 122 with different light transmittances.

In detail, the light transmittance of the first portion 121 may be lower than light transmittance of the second portion 122.

As such, an amount of light discharged toward the diffusion plate 20 from the insertion hole 30H may be reduced while passing through the first and second portions 121 and 122 and may be the same amount of light and light distribution as light emitted toward the diffusion plate 20 from other portions of the light output surface 31.

The amount of light discharged toward the diffusion plate 20 from the insertion hole 30H may gradually increase with proximity to the light source 60 and, thus, light transmittance of the first portion 121 facing the light source 60 may be lower than light transmittance of the second portion 122 to uniformly convert an amount of light emitted toward the diffusion plate 20 from the cover portion 120. That is, an amount and light distribution of light passed through the cover portion 120 may be the same as an amount and light distribution of light emitted from the light output surface 31.

A structure for converting light of the surrounding portion of the insertion hole 30H through the cover portion 120 is described below.

The first portion 121 may be shaped like an approximate circular sector corresponding to the insertion hole 30H and the second portion 122 may also be shaped like an approximate circular sector corresponding to the insertion hole 30H.

That is, the first portion 121 and the second portion 122 may be shaped like an approximate circular sector the center of the cover portion 120.

As shown in FIG. 5, the first portion 121 and the second portion 122 may configure the cover portion 120 shaped like a circular plate while being coupled to each other. Accordingly, the sum of a central angle of the first portion 121 shaped like a circular sector and a central angle of the second portion 122 shaped like a circular sector may be 360°.

The central angle of the first portion 121 may be smaller than the central angle of the second portion 122. Accordingly, an area of the first portion 121 may be smaller than an area of the second portion 122 and a length of an arc of the first portion 121 may be smaller than a length of an arc of the second portion 122.

However, a shape of the cover portion 120 may be changed in various ways according to a shape of the insertion hole 30H and distribution of light discharged from the insertion hole 30H, and a relative size and shape of the first portion 121 and the second portion 122 which cover the insertion hole 30H may also be changed in various ways according to an amount of light and distribution of light discharged toward the diffusion plate 20 from the insertion hole 30H.

Figure 8:
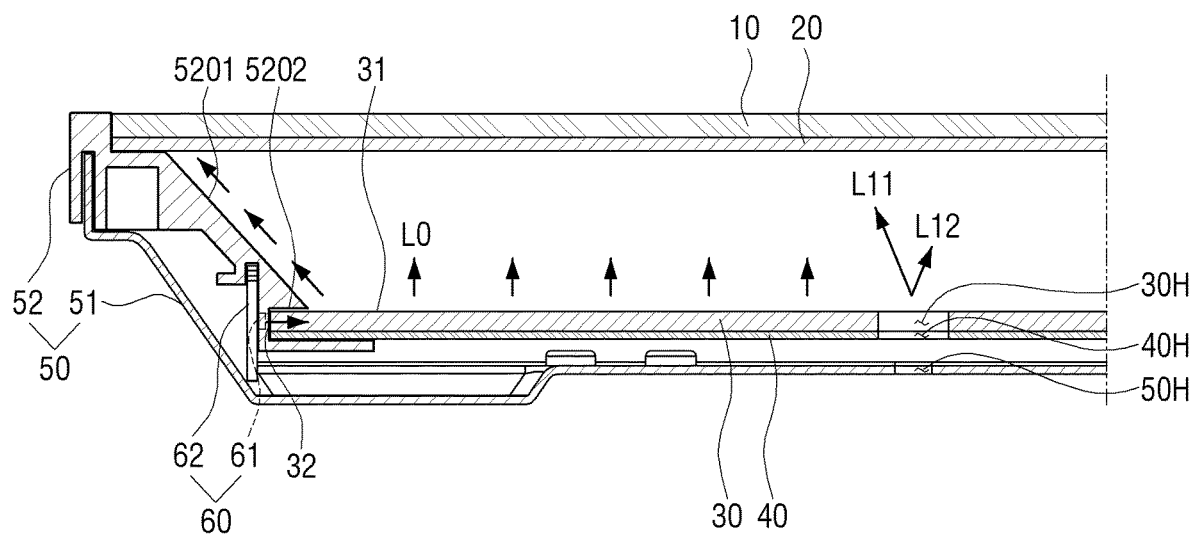
FIG. 8 is a cross-sectional view showing an optical path of a display apparatus in a state in which a support member is removed according to an embodiment.
Figure 9:
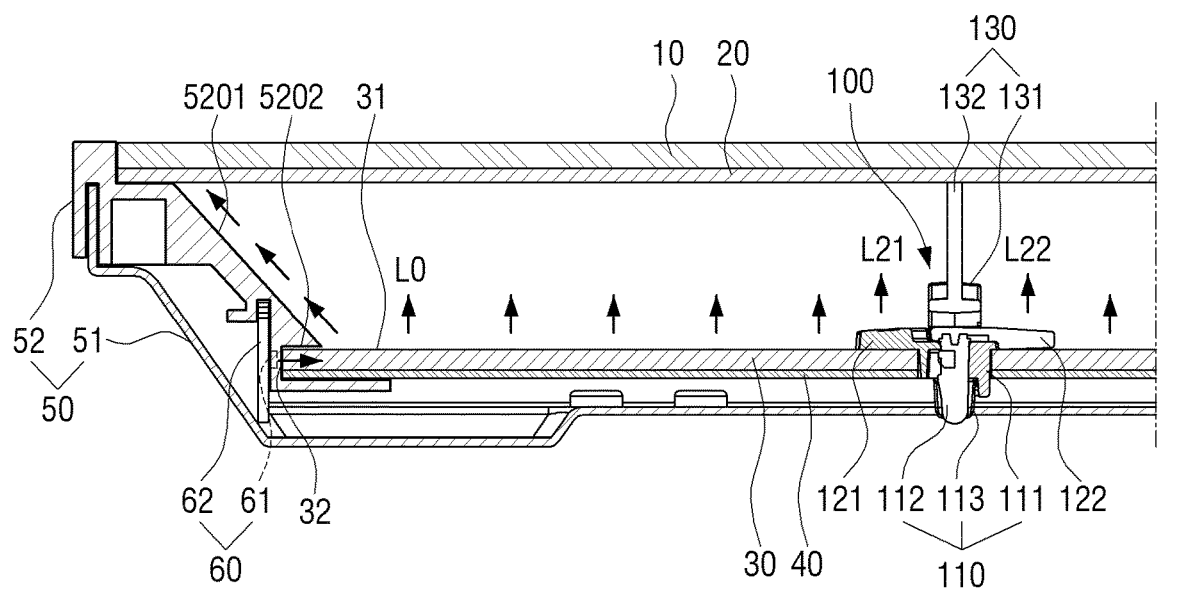
FIG. 9 is a cross-sectional view showing an optical path of a display apparatus in a state in which a support member is coupled according to an embodiment.

FIG. 8 is a cross-sectional view showing an optical path of the display apparatus 1 in a state in which the support member 100 is removed according to an embodiment. FIG. 9 is a cross-sectional view showing an optical path of the display apparatus 1 in a state in which the support member 100 is coupled according to an embodiment.

Hereinafter, a structure for adjusting an amount of light and light distribution around the insertion hole 30H through the support member 100 is described with reference to FIGS. 8 and 9.

For convenience of description, in FIGS. 8 and 9, light emitted to the light guide plate 30 from the light source 60 and light discharged from the light guide plate 30 are indicated by arrows.

Referring to FIGS. 8 and 9, light emitted toward the light incident portion 32 of the light guide plate 30 from the light-emitting device 61 of the light source 60 may pass through an internal portion of the light guide plate 30 and may be discharged as surface light L0 with a uniform amount of light and light distribution through the light output surface 31.

A portion of the surface light L0 discharged toward the diffusion plate 20 from the edge portion of the light output surface 31 may be guided along the inclination portion 5201 of the holder 52 to be emitted to the edge portion of the diffusion plate 20.

As such, even if an area of the diffusion plate 20 and the display panel 10 is larger than an area of the light guide plate 30, the surface light L0 discharged from the light output surface 31 may be uniformly emitted to an entire region of the diffusion plate 20 and the display panel 10.

However, as shown in FIG. 8, a portion of light incident on the light guide plate 30 may be discharged toward the diffusion plate 20 through the insertion hole 30H formed in the light guide plate 30 in a state in which the support member 100 is removed and, thus, a light leaking phenomenon may occur around the insertion hole 30H of the light output surface 31.

Light discharged through the insertion hole 30H may have a larger amount of light than the surface light L0 discharged through the light output surface 31. Accordingly, in a state in which the support member 100 is removed, a bright portion may be formed in an image displayed through the display panel 10 at a position corresponding to the insertion hole 30H.

The bright portion formed at the position corresponding to the insertion hole 30H may have higher brightness than a surrounding thereof and, thus, quality of an image displayed on the display panel 10 may be degraded.

In a state in which the support member 100 is removed, an amount of light discharged toward the diffusion plate 20 from the insertion hole 30H may increase with proximity to the light source 60.

In detail, in a state in which the support member 100 is removed, light discharged toward the diffusion plate 20 from the insertion hole 30H may be divided into first discharged light L11 and second discharged light L12 as shown, e.g., in FIG. 8.

The first discharged light L11 is closer to the light source 60 than the second discharged light L12 and, thus, an amount of the first discharged light L11 may be higher than an amount of the second discharged light L12.

An amount of the first discharged light L11 may be higher than an amount of the surface light L0 discharged with uniform amount of light from the light output surface 31.

An amount of the second discharged light L12 may be equal to or greater than an amount of the surface light L0.

Accordingly, a light leaking phenomenon may occur in the insertion hole 30H by the first and second discharged light L11 and L12 discharged from the insertion hole 30H.

The first and second discharged light L11 and L12 may further include light discharged toward the diffusion plate 20 from the insertion hole 30H and light emitted toward the diffusion plate 20 from the surrounding portion of the insertion hole 30H.

The cover portion 120 that contacts the light output surface 31 to cover the insertion hole 30H may include the first and second portions 121 and 122 with different light transmittance to prevent a light leaking phenomenon caused by the insertion hole 30H and may equalize an amount of light and light distribution of the surrounding portion of the insertion hole 30H with the surface light L0.

As shown in FIG. 9, the first portion 121 of the cover portion 120 may be closer to the light source 60 than the second portion 122.

As described above, the first portion 121 may be shaped like an approximate circular sector corresponding to the insertion hole 30H and the second portion 122 may also be shaped like an approximate circular sector corresponding to the insertion hole 30H.

In addition, the first portion 121 and the second portion 122 may configure the cover portion 120 shaped like a circular plate while being coupled to each other.

Accordingly, the first portion 121 may be radially configured around the insertion hole 30H and, thus, may effectively block a portion of light discharged from the insertion hole 30H.

The first and second discharged light L11 and L12 may be emitted from the insertion hole 30H to a rear side of the cover portion 120 for covering the surrounding portion of the insertion hole 30H.

In detail, the first discharged light L11 may be emitted to the first portion 121 from the insertion hole 30H and the second discharged light L12 may be emitted to the second portion 122 from the insertion hole 30H.

The first discharged light L11 emitted to the first portion 121 may be partially blocked by the first portion 121 and, thus, may be emitted as first converted light L21 to the diffusion plate 20. Accordingly, light of the surrounding portion of the first portion 121 may be emitted as the first converted light L21 toward the diffusion plate 20.

The second discharged light L12 emitted to the second portion 122 may be partially blocked by the second portion 122 and light of the surrounding portion of the second portion 122 may be emitted as second converted light L22 toward the diffusion plate 20.

As described above, light transmittance of the first portion 121 may be lower than light transmittance of the second portion 122 and, thus, even if an amount of the first discharged light L11 incident on the first portion 121 is greater than an amount of the second discharged light L12 incident on the second portion 122, the first converted light L21 and the second converted light L22 may have the same amount of light and light distribution.

For example, the first portion 121 may be formed of a material for blocking light and the second portion 122 may be formed of a material for transmitting light therethrough. Color of the first portion 121 may be white and the second portion 122 may be transparent.

As described above, since an amount of light and light distribution of the second discharged light L12 are the same as an amount of light and light distribution of the surface light L0, the second portion 122 may be configured to be transparent and, thus, the second portion 122 may not block a portion of the second discharged light L12 and may emit the second discharged light L12 as the second converted light L22 with the same amount of light and light distribution as the surface light L0 toward the diffusion plate 20 without light loss.

As such, light transmittance of the first portion 121 included in the cover portion 120 may be lower than the second portion 122, and light discharged toward the diffusion plate 20 from the insertion hole 30H may have a uniform amount of light and light distribution through the cover portion 120.

In addition, light transmittances of the first and second portions 121 and 122 may be set to equalize an amount of light and optical distribution of the first converted light L21 and the second converted light L22 to an amount of light and optical distribution of the surface light L0 and, thus, an amount of light and optical distribution of entire light incident on the diffusion plate 20 and the display panel 10 may be uniform.

An area of the first portion 121 and an area of the second portion 122 may be changed to equalize an amount of light and light distribution of the first converted light L21 and the second converted light L22 to an amount of light and light distribution of the surface light L0.

Although FIGS. 4 to 7 illustrate the case in which an area of the first portion 121 is smaller than an area of the second portion 122, a size of the cover portion 120 and relative sizes of the first portion 121 and the second portion 122 may be changed in various ways according to an amount of light and optical distribution of the discharged light L11 and L12 discharged from the insertion hole 30H.

As such, light transmittances of the first and second portions 121 and 122 of the cover portion 120 and the relative sizes of the first and second portions 121 and 122 may be adjusted to remove a bright portion to be generated in the insertion hole 30H formed in the light guide plate 30 and to prevent a light leaking phenomenon in which image quality is degraded due to the bright portion.

A dark portion may be formed in the surrounding portion of the cover portion 120 for blocking a portion of light discharged from the insertion hole 30H.

In this case, the dark portion may be removed through the second portion 122 with higher light transmittance than the first portion 121, and a shape, arrangement, and size of the second portion 122 may be changed to remove the dark portion to be generated in the surrounding portion of the cover portion 120.

The light transmittance of the insertion portion 110 inserted into the insertion hole 30H of the light guide plate 30 may be adjusted to additionally adjust an amount of light of a surrounding portion of the support member 100.

For example, the insertion portion 110 may be formed of the same material as the first portion 121 and, thus, may block a portion of the discharged light L11 and L12 discharged from the insertion hole 30H.

In detail, the first insertion protrusion 111 of the insertion portion 110 may be formed of the same material as the first portion 121 and, thus, may reflect a portion of light directed toward the insertion hole 30H through an internal portion of the light guide plate 30, toward the internal portion of the light guide plate 30.

The insertion portion 110 may be integrally formed with the first portion 121.

As a detailed example, the first portion 121, the first insertion protrusion 111, and the plurality of fitting members 113 may be integrally formed with each other, and the second portion 122, the support portion 130, and the second insertion protrusion 112 may be integrally formed with each other and may be coupled to the first portion 121.

As such, the support member 100 according to an embodiment may stably support the diffusion plate 20 and a portion of the support member 100, which is closer the light source 60, may have different light transmittance from light transmittance of the remaining portion, thereby preventing a light leaking phenomenon generated by the insertion hole 30H. As such, the support member 100 may equalize an amount of light and light distribution of light emitted toward the diffusion plate 20 from the surrounding portion of the support member 100 to the surface light L0 emitted from the light output surface 31.

Figure 10:
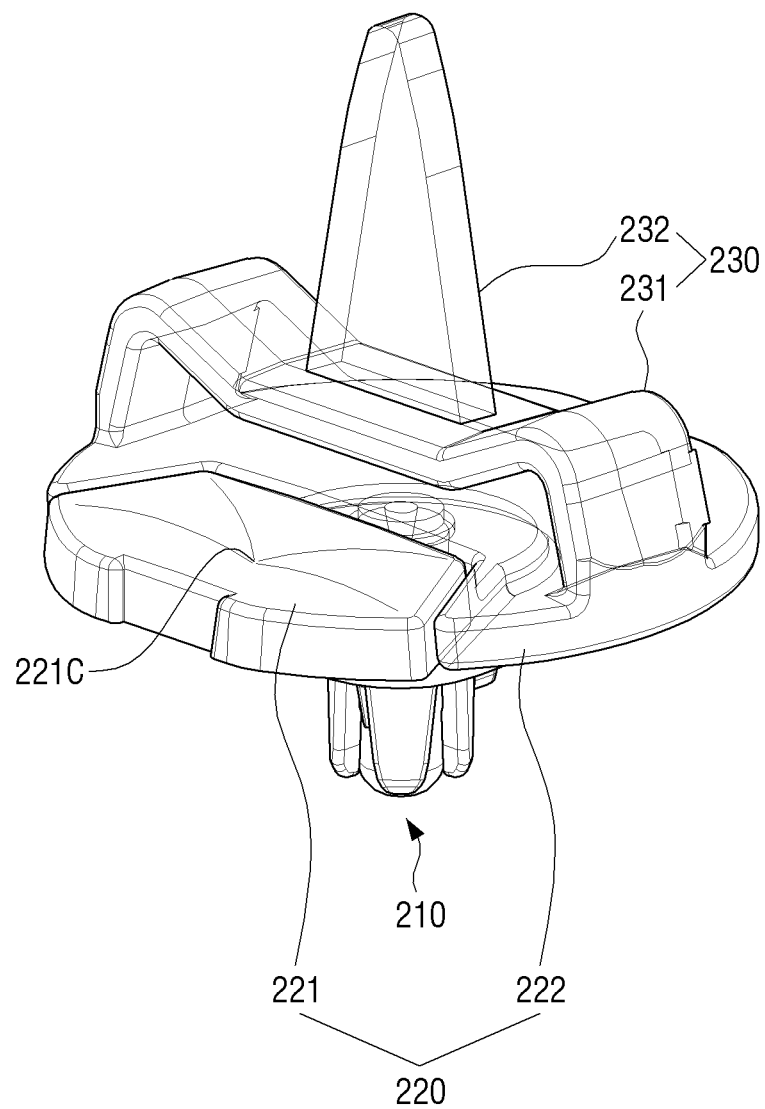
FIG. 10 is a perspective view of a support member according to another embodiment.
Figure 11:
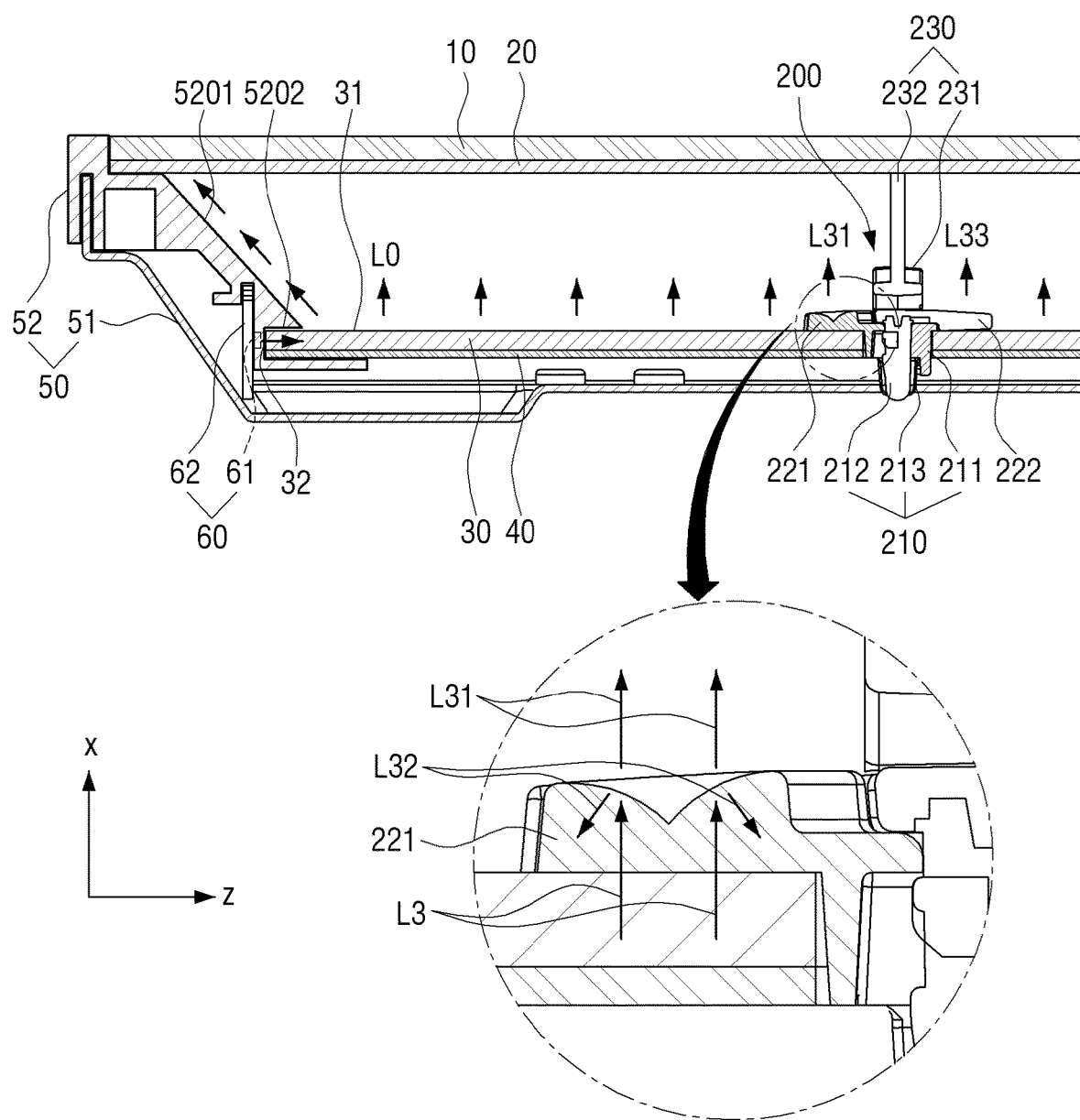
FIG. 11 is a cross-sectional view of a display apparatus according to another embodiment.

FIG. 10 is a perspective view of a support member 200 according to another embodiment. FIG. 11 is a cross-sectional view of a display apparatus 2 according to another embodiment.

As shown in FIG. 10, the support member 200 according to another embodiment may include an insertion portion 210, a cover portion 220, and a support portion 230.

The insertion portion 210 may include a first insertion protrusion 211, a second insertion protrusion 212, and a plurality of fitting members 213 and the support portion 230 may include a buffer portion 231 and a support protrusion 232.

However, the insertion portion 210 and the support portion 230 are the same as the insertion portion 110 and the support portion 130 of the support member 100 according to an embodiment shown in FIGS. 4 to 7 and, thus, a repeated description is omitted herein and, hereafter, the cover portion 220 according to another embodiment is described in terms of a structure and function of the cover portion 220.

The cover portion 220 may cover a surrounding portion of the insertion hole 30H and, thus, may block a portion of light discharged toward the diffusion plate 20 from the insertion hole 30H.

In detail, the cover portion 220 may include a first portion 221 disposed at a side of the insertion hole 30H closer to the light source 60 and a second portion 222 disposed at an opposite side of the insertion hole 30H with respect to the light source 60.

The cover portion 220 may be shaped like a plate that contacts the light output surface 31 and covers the surrounding portion of the insertion hole 30H and may be shaped like an approximate circular plate.

The first portion 221 may be shaped like an approximate circular sector corresponding to the insertion hole 30H and the second portion 222 may also be shaped like an approximate circular sector corresponding to the insertion hole 30H.

In addition, the first portion 221 and the second portion 222 may configure the cover portion 220 shaped like a circular plate while being coupled to each other.

As shown in FIGS. 10 and 11, the first portion 221 facing the light source 60 may include a reflective lens for reflecting light discharged from the insertion hole 30H.

The first portion 221 may be a reflective lens with an upper surface central portion 221C that is concave toward the light guide plate 30.

Referring to FIG. 11, discharged light L3 discharged from the insertion hole 30H may be incident on the first portion 221 through the light guide plate 30.

Partial light L32 of the discharged light L3 incident on an internal portion of the first portion 221 may be reflected toward the light guide plate 30 by the first portion 221 configured with a reflective lens and the remaining light L31 that is not reflected by the first portion 221 may be emitted toward the diffusion plate 20 through the first portion 221.

The light L31 that is emitted to the diffusion plate 20 through the first portion 221 rather being reflected by the first portion 221 among the discharged light L3 incident on the first portion 221 may be referred to as the converted light L31.

The converted light L31 passing through the first portion 221 may have the same amount of light and light distribution as the surface light L0 discharged from the light output surface 31.

In addition, an amount of light and light distribution of the discharged light L3 discharged from the insertion hole 30H may be converted by the second portion 222 and, thus, an amount of light and light distribution of light L33 of a surrounding portion of the second portion 222 may also be the same as the surface light L0.

A structure of the second portion 222 is the same as the second portion 122 of the support member 100 according to an embodiment shown in FIGS. 4 to 7 and, thus, a repeated description is omitted herein.

As such, the first portion 221 may include a reflective lens for reflecting a portion of the discharged light L3 discharged from the insertion hole 30H to prevent a light leaking phenomenon to be generated by the insertion hole 30H, and an amount of light and light distribution of light emitted toward the diffusion plate 20 from the surrounding portion of the support member 200 may be equalized to the surface light L0 discharged from the light output surface 31 to prevent a light portion from being generated in an image displayed through the display panel 10.

Figure 12:
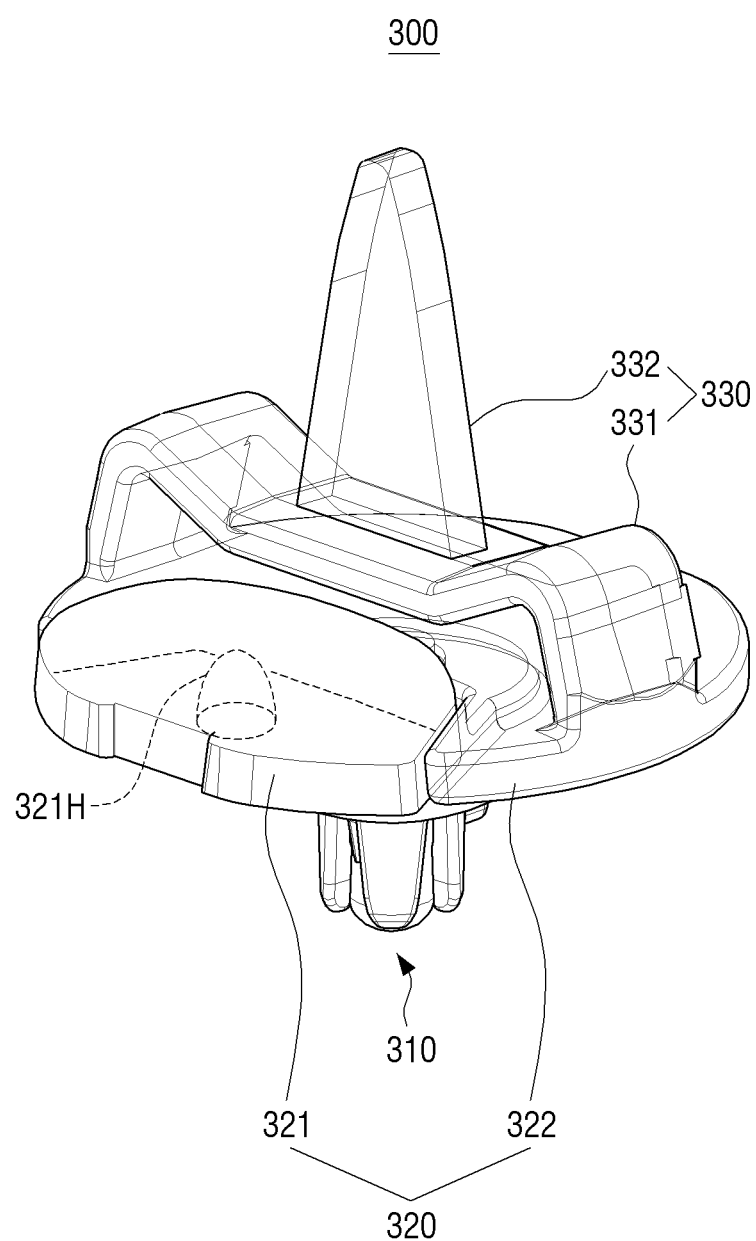
FIG. 12 is a perspective view of a support member according to another embodiment.
Figure 13:
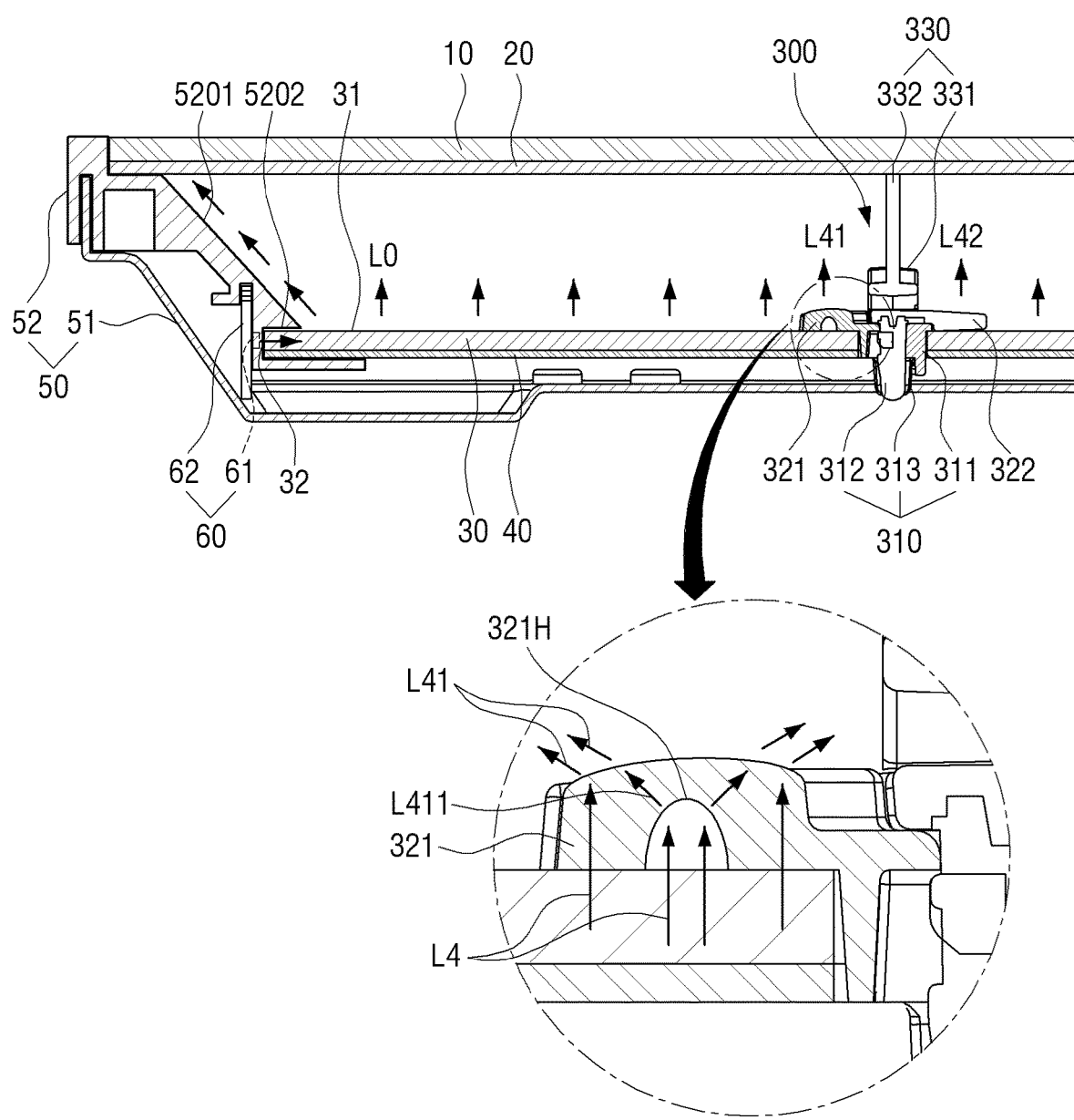
FIG. 13 is a cross-sectional view of a display apparatus according to another embodiment.

FIG. 12 is a perspective view of a support member 300 according to another embodiment. FIG. 13 is a cross-sectional view of a display apparatus 3 according to another embodiment.

As shown in FIG. 12, the support member 300 according to another embodiment may include an insertion portion 310, a cover portion 320, and a support portion 330.

The insertion portion 310 may include a first insertion protrusion 311, a second insertion protrusion 312, and a plurality of fitting member 313 and the support portion 330 may include a buffer portion 331 and a support protrusion 332.

However, the insertion portion 310 and the support portion 330 are the same as the insertion portion 110 and the support portion 130 of the support member 100 according to an embodiment shown in FIGS. 4 to 7 and, thus, a repeated description is omitted herein and, hereafter, the cover portion 320 according to another embodiment is described in terms of a structure and function of the cover portion 320.

The cover portion 320 may cover a surrounding portion of the insertion hole 30H to block a portion of light discharged toward the diffusion plate 20 from the insertion hole 30H.

In detail, the cover portion 320 may include a first portion 321 disposed at a side of the insertion hole 30H closer to the light source 60 and a second portion 322 disposed at an opposite side of the insertion hole 30H with respect to the light source 60.

The cover portion 320 may be shaped like a plate that contacts the light output surface 31 to cover the surrounding portion of the insertion hole 30H and may have an approximate circular shape.

The first portion 321 may be shaped like an approximate circular sector corresponding to the insertion hole 30H and the second portion 322 may also be shaped like an approximate circular sector corresponding to the insertion hole 30H. The first portion 321 and the second portion 322 may configure the cover portion 320 shaped like a circular plate while being coupled to each other.

As shown in FIGS. 12 and 13, the first portion 321 facing the light source 60 may include a diffusion lens for diffusing light discharged from the insertion hole 30H.

A refraction groove 321H that is concave upward from a rear surface of the first portion 321 may be formed behind the first portion 321 configured with a diffusion lens.

Referring to FIG. 13, discharged light L4 discharged from the insertion hole 30H may be incident on the first portion 321 through the light guide plate 30.

In detail, the discharged light L4 may pass through the refraction groove 321H and may be introduced into the first portion 321 while being refracted and diffused, and refracted light L411 refracted through the refraction groove 321H may be diffused by passing through an upper surface of the first portion 321 configured with a diffusion lens.

The discharged light L4 may be incident on an internal portion of the first portion 321 rather than passing through the concave refraction groove 321H and may be diffused by passing through the upper surface of the first portion 321 configured with a diffusion lens.

As such, the discharged light L4 may be incident on the first portion 321 and diffused and may be converted into converted light L41 with the same amount of light and light distribution as the surface light L0 emitted through the light output surface 31.

The amount of light and light distribution of the discharged light L4 discharged from the insertion hole 30H may be converted by the first portion 321 and, thus, light L42 of a surrounding portion of the second portion 322 may also have the same amount of light and light distribution as the surface light L0.

A structure of the second portion 322 is the same as the second portion 122 of the support member 100 according to an embodiment shown in FIGS. 4, 5, 6, and 7 and, thus, a repeated description is omitted herein.

As such, the first portion 321 may include a diffusion lens for diffusing a portion of discharged light discharged from the insertion hole 30H to prevent a light leaking phenomenon to be generated by the insertion hole 30H, and an amount of light and light distribution of light emitted toward the diffusion plate 20 from the surrounding portion of the support member 300 may be equalized to the surface light L0 discharged from the light output surface 31 to prevent a bright portion from being generated in an image displayed through the display panel 10.

FIGS. 14A, 14B, 14C, 14D, 14E, and 14F are diagrams showing modified examples of a covering portion of the support member 100 according to embodiments. Cover portions shown in FIGS. 14A, 14B, 14C, 14D, 14E, and 14F are shown as a plan view viewed from a side of the diffusion plate 20.

As described above, the cover portion 120 of the support member 100 may be changed in various shapes according to a size and shape of the insertion hole 30H, and an amount of light and light distribution of discharged light discharged from the insertion hole 30H and a shape and size of the first and second portions 121 and 122 configuring the cover portion 120 may also be changed in various ways.

Figures 14A, 14B, 14C:
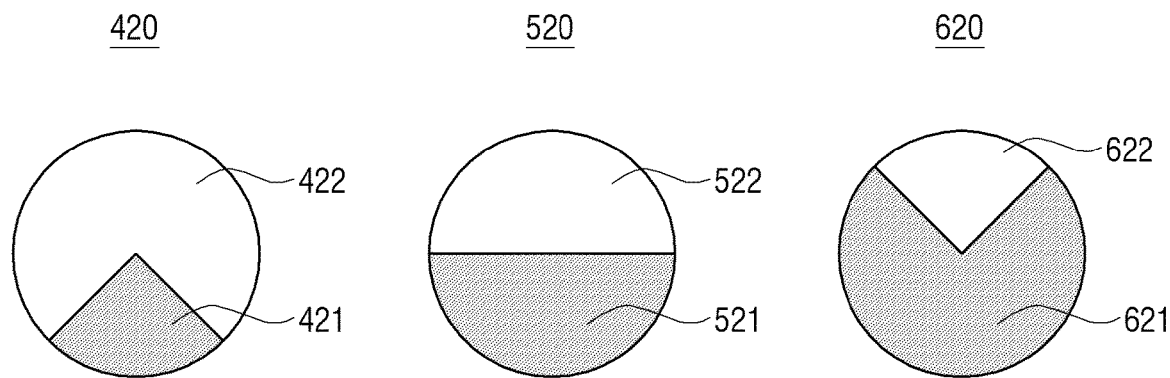
FIGS. 14A, 14B, 14C, 14D, 14E, and 14F are diagrams showing modified examples of a covering portion of a support member according to an embodiments.

In detail, as shown in FIGS. 14A, 14B, and 14C, cover portions 420, 520, and 620 may each be shaped like a circular plate. In addition, the cover portions 420, 520, and 620 may be shaped like a circle viewed from the diffusion plate 20, and first portions 421, 521, and 621 and second portions 422, 522, and 622 may each be shaped like a circular sector based on the insertion hole 30H.

As shown in FIG. 14A, a size of the first portion 421 may be smaller than a size of the second portion 422 and a size of a central angle of the first portion 421 may be smaller than a size of a central angle of the second portion 422.

As shown in FIG. 14B, the first portion 521 and a second portion 522 may be shaped like a circle with the same shape and size. In this case, an amount of a portion of light discharged from the insertion hole 30H, which is blocked by the cover portion 520, may be higher than in the cover portion 420 shown in FIG. 14A.

Accordingly, when light amounts discharged from the insertion holes 30H are the same, an amount of light emitted to the diffusion plate 20 through the cover portion 420 shown in FIG. 14A may be higher than an amount of light emitted to the diffusion plate 20 through the cover portion 520 shown in FIG. 14B.

As shown in FIG. 14C, the first and second portions 621 and 622 may be shaped like a circular sector based on the insertion hole 30H, and a size of the first portion 621 may be larger than a size of the second portion 622.

Accordingly, a size of a central angle of the first portion 621 is larger than a size of a central angle of the second portion 622 and a length of an arc of the first portion 621 may also be greater than a length of an arc of the second portion 622.

As such, a size of the first portion 621 is larger than the second portion 622 and, thus, a degree by which light discharged from the insertion hole 30H is blocked may be further enhanced and, a smaller amount of light may be emitted to the diffusion plate 20 than an amount of light emitted to the diffusion plate through the cover portion 520 shown in FIG. 14B.

As such, relative areas of the first portions 421, 521, and 621 and the second portions 422, 522, and 622 which configure the cover portions 420, 520, and 620 may be changed to change an amount of light and light distribution of light discharged to the diffusion plate 20 through the cover portions 420, 520, and 620.

Figures 14D, 14E, 14F:
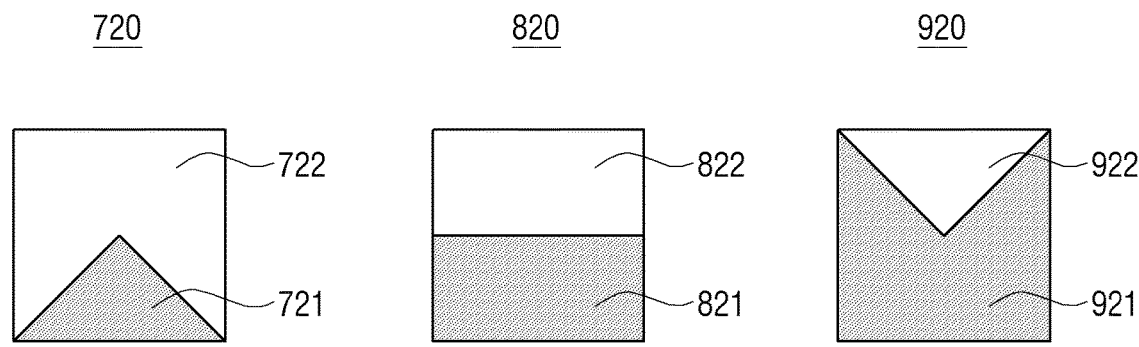

As shown in FIGS. 14D, 14E, and 14F, cover portions 720, 820, and 920 may each be shaped like a square plate.

An amount of light and light distribution of light discharged toward the diffusion plate 20 from the insertion hole 30H may be changed according to a shape of the insertion hole 30H, a shape of the insertion portion 110, a structure of the light source 60, or the like and, thus, when light discharged toward the diffusion plate 20 from the insertion hole 30H is discharged in the form of a square, the cover portions 720, 820, and 920 may be shaped like a square to effectively block the discharged light and to uniformly change an amount of light and light distribution of light discharged toward the diffusion plate 20 through the cover portions 720, 820, and 920.

First portions 721, 821, and 921 and second portions 722, 822, and 922 may be coupled to each other to shape the cover portions 720, 820, and 920 like a square, and a boundary between the first portions 721, 821, and 921 and the second portions 722, 822, and 922 may pass through a center of the insertion hole 30H or a center of the cover portions 720, 820, and 920.

As shown in FIG. 14D, the first portion 721 may be shaped like a triangle, a vertex of which is disposed in the center of the cover portion 720, and the second portion 722 may be shaped like a concave pentagon and may be coupled to the first portion 721 to be shaped like a square.

As shown in FIG. 14E, the first portion 821 and the second portion 822 may be shaped like a rectangle with the same shape and size and, as shown in FIG. 14F, the first portion 921 may be shaped like a concave pentagon, and the second portion 922 may be shaped like a triangle, a vertex of which is disposed in a center of the cover portion 920.

Accordingly, an amount of light emitted to the diffusion plate 20 through the cover portion 720 shown in FIG. 14D may be larger than an amount of light emitted to the diffusion plate 20 through the cover portion 820 shown in FIG. 14E, and an amount of light emitted to the diffusion plate 20 through the cover portion 820 shown in FIG. 14E may be larger than an amount of light emitted to the diffusion plate 20 through the cover portion 920 shown in FIG. 14F.

However, other than the aforementioned structures of the cover portions 420, 520, 620, 720, 820, and 920, the cover portions may be configured in various shapes and sizes, and shapes and relative sizes of the first and second portions included in the cover portion may also be changed in various ways.

As such, the shape and size of the cover portion may be changed in various ways and, thus, an amount of light and light distribution of light discharged from the insertion hole 30H may be changed through the cover portion, and an amount of light and light distribution of light around the support member may be equalized to an amount of light and light distribution of the surface light L0 emitted to the diffusion plate 20 through the light output surface 31, thereby preventing a light leaking phenomenon from occurring in the insertion hole 30H.

Other than the aforementioned structures of the support members 100, 200, and 300 according to the present disclosure, the support member may be divided into parts with different light transmittances, thereby preventing a light or dark portion from being generated by the insertion hole 30H of the light guide plate 30.

The display apparatuses 1, 2, and 3 according to the present disclosure may be configured in such a way that a predetermined optical distance length DL is formed between the light guide plate 30 and the diffusion plate 20 to uniformly guide light of the light guide plate 30 to the diffusion plate 20 through the inclination portion 5201 and, thus, light emitted toward the diffusion plate 20 from the light guide plate 30 may be effectively diffused, thereby reducing a size of the light guide plate 30.

The diffusion plate 20 and the display panel 10 may be stably supported through the support members 100, 200, and 300.

The support members 100, 200, and 300 may be configured with different light transmittances with respect to the respective portions thereof, thereby preventing a light leaking phenomenon from occurring due to the insertion hole 30H to which the support members 100, 200, and 300 are coupled.

Although various embodiments have been separately described, the embodiments are not inevitably embodied alone and the configuration and operation of the embodiments may be used in combination thereof.

The foregoing embodiments and advantages are merely and are not to be construed as limiting the present disclosure. The present teaching can be readily applied to other types of apparatuses. Also, the description of the embodiments is intended to be illustrative, and not to limit the scope of the claims, and many alternatives, modifications, and variations will be apparent to those skilled in the art.

What is claimed is:

1. A display apparatus comprising:
 a display panel;
 a light guide plate configured to guide light to the display panel and disposed behind the display panel;
 a light source configured to emit light to a lateral surface of the light guide plate;
 a diffusion plate disposed between the display panel and the light guide plate; and
 at least one support member configured to support the diffusion plate and disposed to pass through the light guide plate,
 wherein a light transmittance of a first portion of the at least one support member at a side of the at least one support member facing the light source is different from a light transmittance of a second portion of the at least one support member forming a side opposite to the side of the at least one support member facing the light source.

2. The display apparatus as claimed in claim 1, wherein the light guide plate includes at least one insertion hole to which the at least one support member is coupled,
 wherein the at least one support member comprises an insertion portion inserted into the at least one insertion hole, a cover portion that contacts a light output surface of the light guide plate and covers the at least one insertion hole, and a support portion that supports the diffusion plate, and
 wherein a light transmittance of a portion of the cover portion at the side of the at least one support member facing the light source is lower than a light transmittance of a remaining portion of the cover portion.

3. The display apparatus as claimed in claim 2, wherein a diameter of the cover portion is larger than a diameter of the at least one insertion hole to cover a surrounding portion of the at least one insertion hole, and
 wherein the insertion portion protrudes toward the at least one insertion hole from a center of the cover portion.

4. The display apparatus as claimed in claim 3, wherein the cover portion comprises the first portion, and the second portion, and
 wherein the light transmittance of the first portion is lower than the light transmittance of the second portion.

5. The display apparatus as claimed in claim 4, wherein the cover portion comprises a plate positioned parallel to the light output surface.

6. The display apparatus as claimed in claim 5, wherein the cover portion comprises a circular plate, and
 wherein the first portion has a circular sector shape with respect to a center of the at least one insertion hole, and
 wherein the second portion has a complementary circular sector shape to the circular sector shape of the first portion.

7. The display apparatus as claimed in claim 6, wherein a central angle of the first portion is smaller than a central angle of the second portion.

8. The display apparatus as claimed in claim 4, wherein the first portion comprises a light-blocking material; and
wherein the second portion comprises a light-transmissive material.

9. The display apparatus as claimed in claim 8, wherein the first portion is white and the second portion is transparent.

10. The display apparatus as claimed in claim 8, wherein the insertion portion comprises the light-blocking material.

11. The display apparatus as claimed in claim 10, wherein the first portion and the insertion portion are integrally formed with each other.

12. The display apparatus as claimed in claim 4, wherein the first portion comprises a reflective lens configured to reflect light discharged from the at least one insertion hole.

13. The display apparatus as claimed in claim 4, wherein the first portion comprises a diffusion lens configured to diffuse light discharged from the at least one insertion hole.

14. The display apparatus as claimed in claim 2, wherein the support portion protrudes toward the diffusion plate from a center of the cover portion.

15. The display apparatus as claimed in claim 14, wherein the support portion comprises an arch-shaped buffer portion with opposite ends coupled to the cover portion and a support protrusion coupled to the buffer portion to support the diffusion plate.

16. A display apparatus comprising:
a light guide plate;
a diffusion plate;
a light source configured to emit light toward a side surface of the light guide plate; and
a support member comprising:
a contact portion configured to contact a rear surface of the diffusion plate;
a fitting portion configured to fit into a hole provided in the light guide plate; and
a disk portion configured to rest on a front surface of the light guide plate,
wherein the disk portion comprises a first region provided closer to the light source than a second region of the disk portion, the second region forming an opposite side of the disk portion from a side of the first region, and
wherein a light transmittance of the first region is lower than a light transmittance of the second region.

17. The display apparatus as claimed in claim 16, further comprising a display panel provided in front of the diffusion plate.

18. The display apparatus as claimed in claim 16, further comprising a chassis provided behind the light guide plate,
wherein the fitting portion of the support member is further configured to fit into a hole provided in the chassis.

19. The display apparatus as claimed in claim 16, wherein the first region of the disk portion comprises a partial reflective lens.

20. The display apparatus as claimed in claim 16, wherein a refraction groove is formed in the first region of the disk portion.

* * * * *